US012352859B2

(12) United States Patent
Tsuji

(10) Patent No.: US 12,352,859 B2
(45) Date of Patent: Jul. 8, 2025

(54) POSITION MANAGEMENT DEVICE, POSITION MANAGEMENT SYSTEM, POSITION MANAGEMENT METHOD AND NON-TRANSITORY COMPUTER-READABLE MEDIUM HAVING PROGRAM STORED THEREON

(71) Applicant: NEC Corporation, Tokyo (JP)

(72) Inventor: Akira Tsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 925 days.

(21) Appl. No.: 17/606,803

(22) PCT Filed: May 9, 2019

(86) PCT No.: PCT/JP2019/018474
§ 371 (c)(1),
(2) Date: Oct. 27, 2021

(87) PCT Pub. No.: WO2020/225894
PCT Pub. Date: Nov. 12, 2020

(65) Prior Publication Data
US 2022/0187455 A1 Jun. 16, 2022

(51) Int. Cl.
G01S 17/08 (2006.01)
G01S 17/00 (2020.01)
G01S 17/89 (2020.01)

(52) U.S. Cl.
CPC ............ G01S 17/08 (2013.01); G01S 17/006 (2013.01); G01S 17/89 (2013.01)

(58) Field of Classification Search
CPC ........ G01S 17/08; G01S 17/006; G01S 17/89; G01S 17/933; G01C 3/06; G06T 1/00
See application file for complete search history.

(56) References Cited

U.S. PATENT DOCUMENTS

2018/0087901 A1 3/2018 Komeichi et al.
2018/0341263 A1* 11/2018 Rust .................. G01S 17/89

FOREIGN PATENT DOCUMENTS

JP 2017-224123 A 12/2017
JP 2018-054380 A 4/2018
JP 2019-039868 A 3/2019

OTHER PUBLICATIONS

International Search Report for PCT Application No. PCT/JP2019/018474, mailed on Jul. 16, 2019.

(Continued)

Primary Examiner — Juan M Guillermety
(74) Attorney, Agent, or Firm — Sughrue Mion, PLLC

(57) ABSTRACT

A position management device includes: a sensor which acquires point cloud data in each unit time; a pair selection unit which selects a pair of the coordinates between first point cloud data and second point cloud data; and a position estimation unit which estimates a position of the moving object by making both coordinates of the pair selected by the pair selection unit correspond to each other and performing positioning processing of the first point cloud data and the second point cloud data. The pair selection unit selects the pair of the coordinates by pairing a first point belonging to the first point cloud data and a second point belonging to the second point cloud data in a case where a difference between a direction of the first point and a direction of the second point is equal to or smaller than a predetermined first threshold.

11 Claims, 12 Drawing Sheets

(56) References Cited

OTHER PUBLICATIONS

Takayuki Yamashita et al., Special Article: Development of SH-60K Patrol Helicopter, Mitsubishi Heavy Industries technical review, Mitsubishi Heavy Industries, Ltd., Dec. 2005, vol. 42, No. 5, p. 208-211.

* cited by examiner

POSITION MANAGEMENT DEVICE, POSITION MANAGEMENT SYSTEM, POSITION MANAGEMENT METHOD AND NON-TRANSITORY COMPUTER-READABLE MEDIUM HAVING PROGRAM STORED THEREON

This application is a National Stage Entry of PCT/JP2019/018474 filed on May 9, 2019, the contents of all of which are incorporated herein by reference, in their entirety.

TECHNICAL FIELD

The present disclosure relates to a position management device, a position management system, a position management method and a non-transitory computer-readable medium having a program stored thereon.

BACKGROUND ART

Various services utilizing drones such as utilization of drones in physical distribution have been proposed in recent years. In places with a possibility to be crowded with aircraft such as drones like a physical distribution base or a densely populated area, positions of the aircraft need to be appropriately managed.

In regard to this, Non Patent Literature 1 discloses a system which guides a helicopter to a landing spot. In the system, by detecting a marker provided on the helicopter by an infrared ray camera, a laser for measuring a distance is emitted to a specific part (specifically a reflector provided near the marker) of a body of the helicopter. Thus, the distance to the specific part (reflector) of the body of the helicopter is measured. According to the technology, the position of the helicopter can be recognized.

CITATION LIST

Non Patent Literature

[Non Patent Literature 1] Takayuki Yamashita, and four others, "Special Article: Development Of SH-60K Patrol Helicopter", Mitsubishi Heavy Industries technical review, Mitsubishi Heavy Industries, Ltd., December 2005, Vol. 42, No. 5, p.208-211

SUMMARY OF INVENTION

Technical Problem

With the technology disclosed in Non Patent Literature 1, it is needed to attach a mark such as a marker or a reflector to a moving object. In addition, in a case where the moving object is moving in such a direction that the mark cannot be seen, the position of a flying object cannot be recognized.

The present disclosure is implemented in order to solve such a problem, and an object is to provide a position management device, a position management system, a position management method and a program capable of recognizing the position of a moving object without providing a mark on the moving object.

Solution to Problem

A position management device relating to a first aspect of the present disclosure includes:

a sensor configured to measure distances of a plurality of parts of a moving object in each unit time and acquire point cloud data indicating coordinates on a space of the plurality of parts in each unit time;

pair selection means for selecting a pair of the coordinates between first point cloud data which is the point cloud data acquired at a first point of time and second point cloud data which is the point cloud data acquired at a second point of time the unit time before the first point of time; and position estimation means for estimating a position of the moving object by making both coordinates of the pair selected by the pair selection means correspond to each other and performing positioning processing of the first point cloud data and the second point cloud data, and the pair selection means selects the pair of the coordinates by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

A position management system relating to a second aspect of the present disclosure includes:

an aircraft and a position management device,
the position management device includes
a sensor configured to measure distances of a plurality of parts of the aircraft in each unit time and acquire point cloud data indicating coordinates on a space of the plurality of parts in each unit time, pair selection means for selecting a pair of the coordinates between first point cloud data which is the point cloud data acquired at a first point of time and second point cloud data which is the point cloud data acquired at a second point of time the unit time before the first point of time, and position estimation means for estimating a position of the aircraft by making both coordinates of the pair selected by the pair selection means correspond to each other and performing positioning processing of the first point cloud data and the second point cloud data, and the pair selection means selects the pair of the coordinates by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

In a position management method relating to a third aspect of the present disclosure, distances of a plurality of parts of a moving object are measured in each unit time by a sensor, point cloud data indicating coordinates on a space of the plurality of parts is acquired in each unit time, a pair of the coordinates is selected between first point cloud data which is the point cloud data acquired at a first point of time and second point cloud data which is the point cloud data acquired at a second point of time the unit time before the first point of time, a position of the moving object is estimated by making both coordinates of the selected pair correspond to each other and performing positioning processing of the first point cloud data and the second point cloud data, and in selecting the pair of the coordinates, the pair of the coordinates is selected by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

A program relating to a fourth aspect of the present disclosure
makes a computer execute
a pair selection step of selecting a pair of coordinates between first point cloud data which is point cloud data acquired at a first point of time by a sensor which measures distances of a plurality of parts of a moving object in each unit time and acquires the point cloud data indicating the coordinates on a space of the plurality of parts in each unit time and second point cloud data which is the point cloud data acquired at a second point of time the unit time before the first point of time and
a position estimation step of estimating a position of the moving object by making both coordinates of the selected pair correspond to each other and performing positioning processing of the first point cloud data and the second point cloud data, and
in the pair selection step, the pair of the coordinates is selected by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

Advantageous Effects of Invention

The present disclosure makes it possible to provide a position management device, a position management system, a position management method and a program capable of recognizing the position of a moving object without providing a mark on the moving object.

DESCRIPTION OF EMBODIMENTS

In order to clarify explanation, description and drawings below are appropriately omitted and simplified. Note that, in the respective drawings, the same signs are attached to the same elements, and overlapping explanation is omitted as needed.

Outline of Example Embodiment

Figure 1:
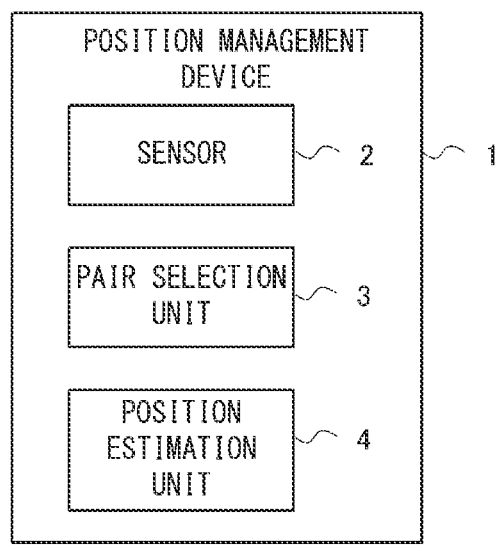
FIG. 1 is a block diagram illustrating an example of a configuration of a position management device relating to an outline of an example embodiment.

Before describing details of the example embodiment, the outline of the example embodiment will be described first. FIG. 1 is a block diagram illustrating an example of a configuration of a position management device 1 relating to the outline of the example embodiment. As illustrated in FIG. 1, the position management device 1 includes a sensor 2, a pair selection unit 3 and a position estimation unit 4, and manages a position of a moving object. Note that the moving object is an aircraft (flying object) for example, but is not limited thereto. For example, the moving object may be an object moving on land.

The sensor 2 measures distances of a plurality of parts of the moving object in each unit time, and acquires point cloud data indicating coordinates on a space of the plurality of parts in each unit time. For example, the sensor 2 is a LiDAR (Light Detection and Ranging) device which emits a beam and measures the distance to the object by time until the beam reflected by the object reaches the sensor 2.

The pair selection unit 3 selects a pair of the coordinates between first point cloud data and second point cloud data. Note that the first point cloud data is the point cloud data acquired at a first point of time by the sensor 2, and the second point cloud data is the point cloud data acquired at a second point of time the unit time before the first point of time by the sensor 2. Here, the pair selection unit 3 selects the pair as follows. That is, the pair selection unit 3 selects the pair of the coordinates by pairing a first point belonging to the first point cloud data and a second point belonging to the second point cloud data in a case where a difference between a direction of the first point and a direction of the second point is equal to or smaller than a predetermined first threshold. Note that the direction of the first point is the direction viewed from the sensor 2 of the first point and the direction of the second point is the direction viewed from the sensor 2 of the second point in more detail.

The position estimation unit 4 estimates the position of the moving object by making both coordinates of the pair selected by the pair selection unit 3 correspond to each other and performing positioning (registration) processing of the first point cloud data and the second point cloud data.

In the position management device 1, the position of the moving object is estimated by using the point cloud data obtained by measuring the distances of arbitrary parts of the moving object. Therefore, the position of the moving object can be recognized without providing a mark on the moving object. In addition, according to the position management device 1, the positioning processing is performed by making the points of closer directions correspond to each other. Thus, compared to the case of performing the positioning processing by making arbitrary points (for example, the points selected at random) correspond to each other, the positioning processing of the point cloud data can be appropriately performed. That is, the position of the moving object can be more appropriately estimated.

Next, the details of the example embodiment will be described.

First Example Embodiment

Figure 2:
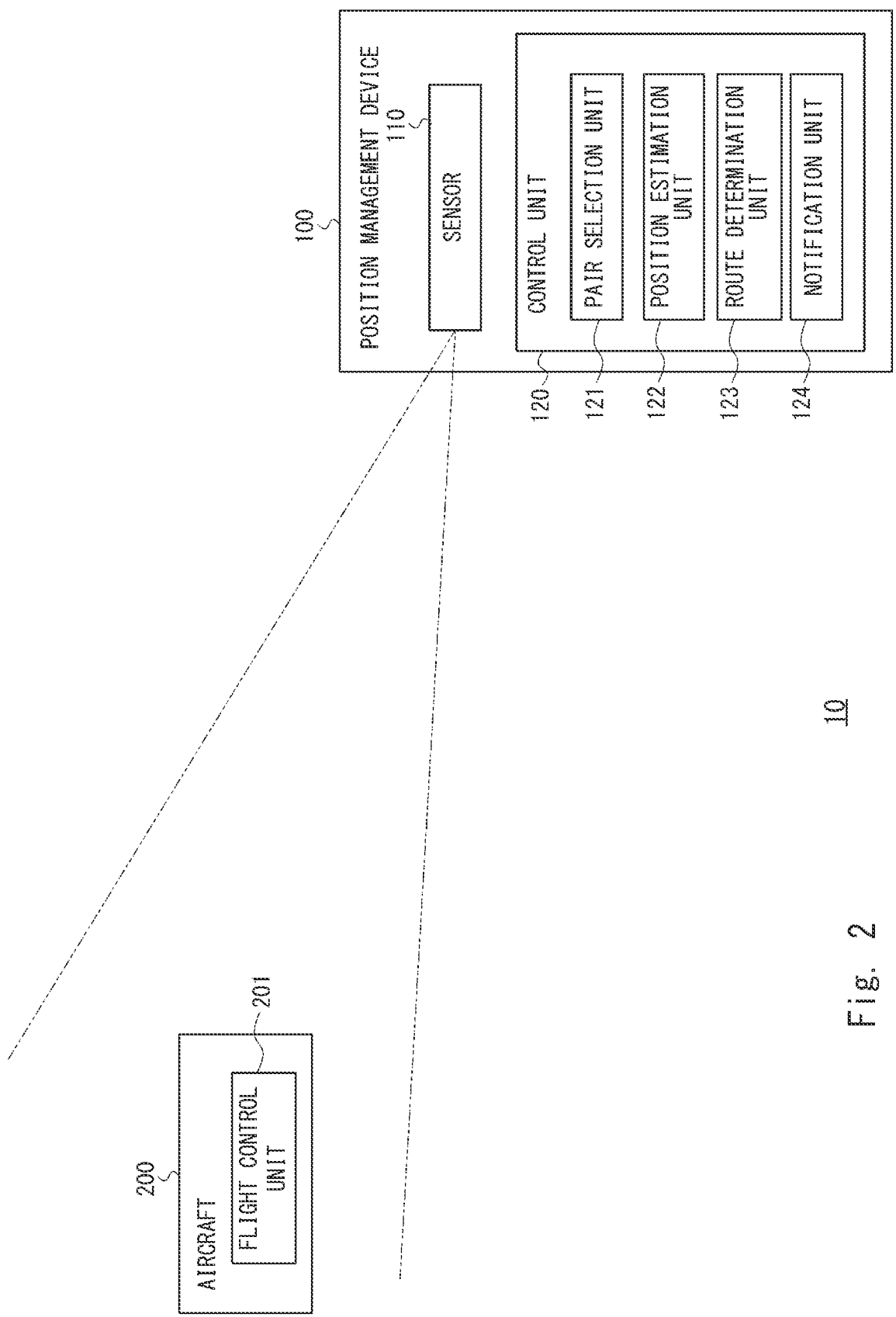
FIG. 2 is a schematic diagram illustrating an example of the configuration of a position management system relating to a first example embodiment.

FIG. 2 is a schematic diagram illustrating an example of the configuration of a position management system 10 relating to the first example embodiment. As illustrated in FIG. 1, the position management system 10 includes an aircraft 200 which is a specific example of the moving object, and a position management device 100. Note that, while only one aircraft 200 is illustrated in FIG. 1, there may be a plurality of aircraft 200.

The aircraft 200 is an unmanned aircraft such as a drone for example, but may be a manned aircraft such as a helicopter. The aircraft 200 includes a flight control unit 201. The flight control unit 201 controls flight of the aircraft. In particular, in the present example embodiment, the flight control unit 201 controls the flight according to notification from a notification unit 124 to be described later of the position management device 100.

The position management device 100 corresponds to the position management device 1 in FIG. 1. In the present example embodiment, the position management device 100 includes a sensor 110 and a control unit 120 as illustrated in FIG. 2.

The sensor 110 corresponds to the sensor 2 in FIG. 1. In the present example embodiment, the sensor 110 is a LiDAR device, and emits a beam for measuring a distance. The sensor 110 measures the distance to the aircraft 200 by measuring the time until the emitted beam is reflected by a body of the aircraft 200 flying in the space and returns to the sensor 110. The beam is periodically emitted in various directions. Thus, the sensor 110 measures the distances of the plurality of parts of the aircraft 200 in each unit time, and acquires the point cloud data indicating the coordinates on the space of the plurality of parts in each unit time.

Figure 3:
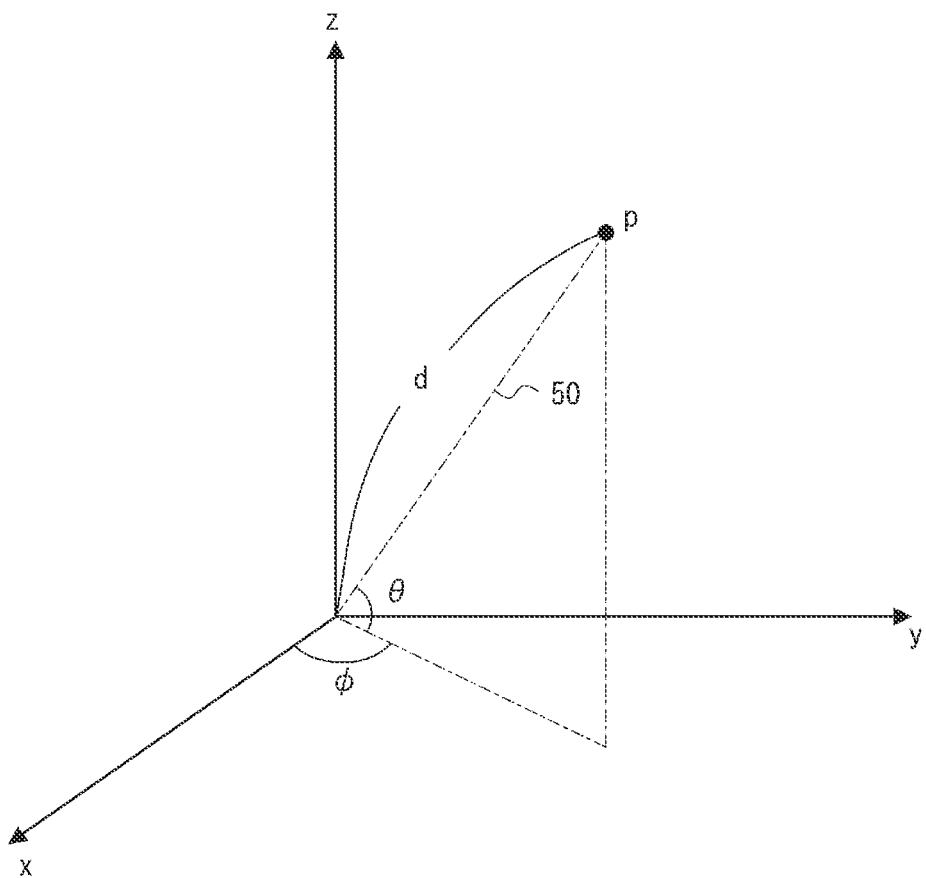
FIG. 3 is a diagram illustrating coordinates obtained by a sensor.

FIG. 3 is a diagram illustrating the coordinates obtained by the sensor 110. The sensor 110 emits the beam in an emission direction 50 to a three-dimensional space as illustrated in FIG. 3. In FIG. 3, an origin indicates the position of the sensor 110, and a point p indicates the position at which the beam emitted in the emission direction 50 is reflected. Note that the emission direction 50 is indicated by an angle (azimuth angle) ϕ of a horizontal component and an angle (elevation/depression angle) θ of a vertical component. The sensor 110 measures a distance d to the point p when the beam is emitted in the emission direction 50. Thus, the sensor 110 acquires the coordinates of the point p uniquely determined by the emission direction 50 and the distance d.

Figure 4:
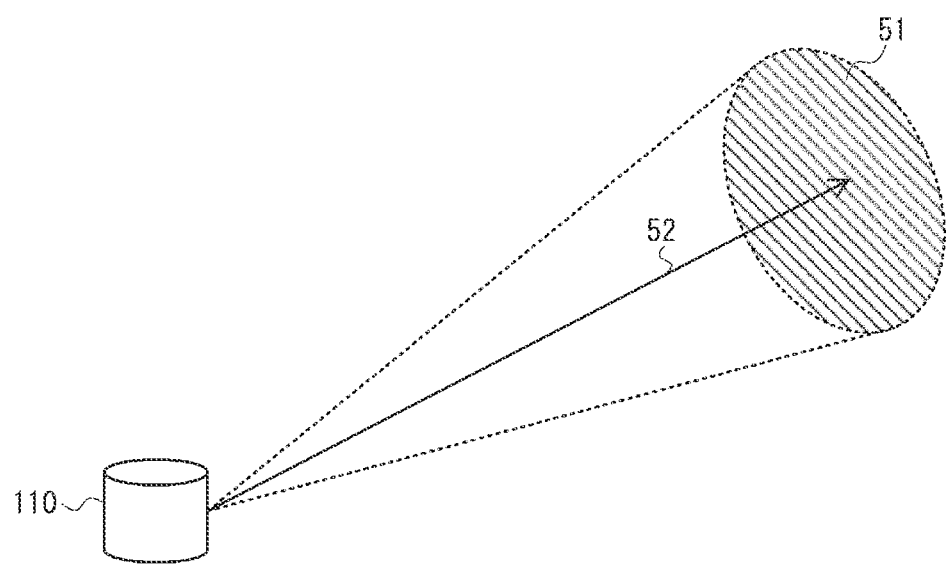
FIG. 4 is a schematic diagram describing emission of a beam of the sensor.

FIG. 4 is a schematic diagram describing emission of the beam by the sensor 110 in the present example embodiment. The sensor 110 emits a beam 52 within a predetermined emission range 51.

Figure 5:
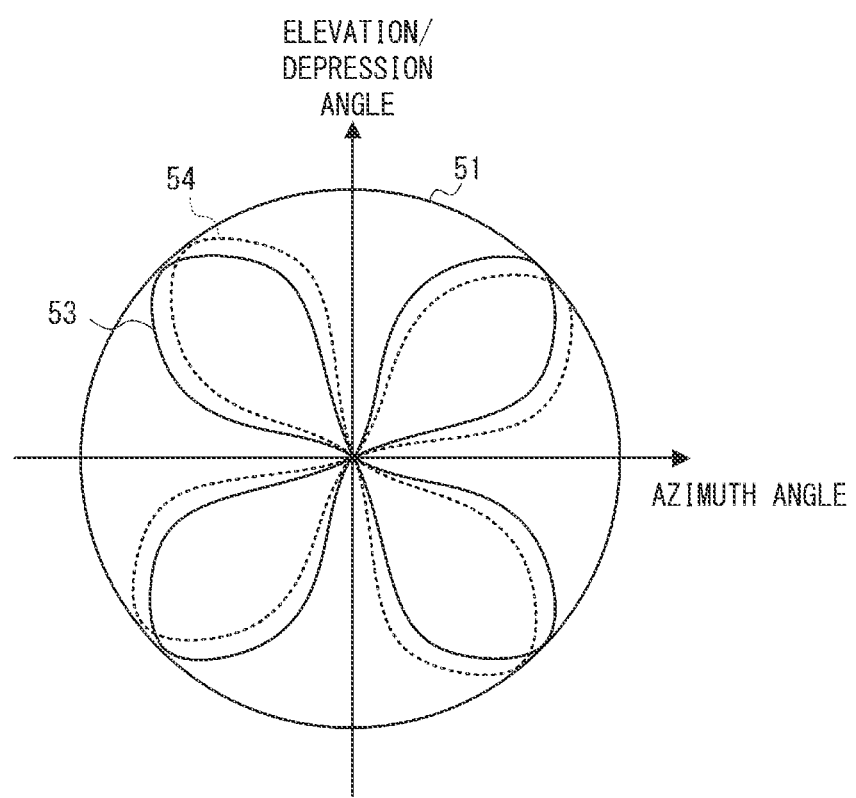
FIG. 5 is a schematic diagram illustrating an example of a scanning track of the beam.

FIG. 5 is a schematic diagram illustrating an example of a scanning track of the beam 52. In FIG. 5, a horizontal axis indicates the azimuth angle at which the beam 52 is emitted, and a vertical axis indicates the elevation/depression angle at which the beam 52 is emitted. The emission range 51 is specified by the azimuth angle and the elevation/depression angle. The sensor 110 emits the beam 52 so as to periodically draw a predetermined scanning track in a period t. In FIG. 5, a scanning track 53 indicated by a solid line within the emission range 51 indicates the scanning track of the beam 52 in a k-th period, and a scanning track 54 indicated by a broken line within the emission range 51 indicates the scanning track of the beam 52 in a (k-1)-th period. Note that k is an integer equal to or larger than 2. As illustrated in FIG. 5, the scanning tracks 53 and 54 are geometrical patterns over the entire predetermined emission range 51 (for example, a circular range), respectively. In such a manner, the sensor 110 periodically performs scanning according to the scanning track in the geometrical pattern over the entire predetermined emission range 51. Note that, while the emission range 51 is a circular shape in FIG. 4 and FIG. 5, it is not limited to the circular shape and may be another arbitrary shape. In addition, while the position of the scanning track (the position of the geometrical pattern) is shifted so as to be rotated by a predetermined angle on an azimuth angle-elevation/depression angle plane in each period in the example illustrated in FIG. 5, the position of the scanning track may be fixed. Further, the geometrical pattern of the scanning tracks 53 and 54 illustrated in FIG. 5 is an example and another arbitrary geometrical pattern may be used.

Figure 6:
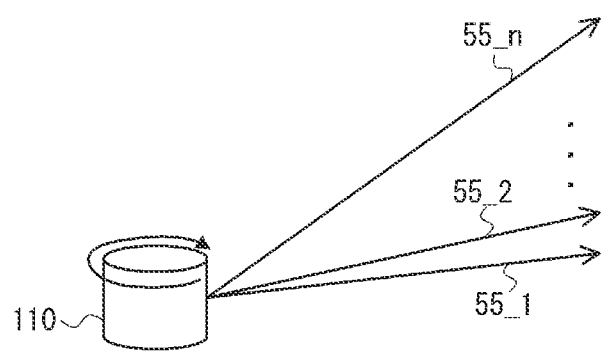
FIG. 6 is a schematic diagram describing the emission of the beam of the sensor.

In the following explanation, the sensor 110 described using FIG. 4 and FIG. 5 is sometimes referred to as a space limitation type LiDAR device. Note that the sensor 110 does not always need to be the space limitation type LiDAR device. The sensor 110 may be a LiDAR device as illustrated in FIG. 6, for example. The sensor 110 illustrated in FIG. 6 emits n (provided that n is an integer equal to or larger than 1) beams 55_1, 55_2, . . . , 55_n into the three-dimensional space. Note that the elevation/depression angle is different among the n beams. Then, the sensor 110 periodically emits the beams 55_1, 55_2, . . . , 55_n in the period tin omniazimuth by rotation of the sensor 110. In the following explanation, the sensor 110 described using FIG. 6 is referred to as an omniazimuth type LiDAR device.

Next, the control unit 120 of the position management device 100 will be described. As illustrated in FIG. 2, the control unit 120 includes a pair selection unit 121, a position estimation unit 122, a route determination unit 123 and the notification unit 124.

The pair selection unit 121 corresponds to the pair selection unit 3 in FIG. 1. By the sensor 110, the point cloud data is acquired in each period t, that is, in each unit time. The pair selection unit 121 selects a pair of the coordinates between the point cloud data (first point cloud data) acquired in the k-th period by the sensor 110 and the point cloud data (second point cloud data) acquired in the (k-1)-th period. That is, the pair formed of the coordinate (the point p) included in the point cloud data acquired in the k-th period and the coordinate (the point p) included in the point cloud data acquired in the (k-1)-th period is determined. The pair selection unit 121 selects one or more pairs satisfying a predetermined condition. Details of processing of the pair selection unit 121 will be described later with reference to a flowchart.

The position estimation unit 122 corresponds to the position estimation unit 4 in FIG. 1. Since the aircraft 200 is an object having a predetermined shape and size, depending on with which part of a surface of the aircraft 200 as a measurement point the distance is measured, the distance obtained as a measurement result varies. Therefore, the position estimation unit 122 estimates the position of the aircraft 200 as follows. The position estimation unit 122 estimates the position of the aircraft 200 by making both coordinates of the pair selected by the pair selection unit 121 correspond to each other and performing positioning processing of the point cloud data acquired in the k-th period and the point cloud data acquired in the (k-1)-th period. The positioning processing is also referred to as registration processing.

The position estimation unit 122 uses known algorithm in the positioning processing of the point cloud data. Specifically, for example, as such algorithm, ICP (Iterative Closest Point) or NDT (Normal Distributions Transform) or the like may be used. In the positioning processing, the coordinates of one point cloud data and the coordinates of the other point cloud data are made to correspond to each other, and a correspondence relation of both of the point cloud data is specified such that the points get closer to each other, that is, the distance between the points becomes short. Thus, by the positioning processing, a parameter indicating how one point cloud data is to be moved and rotated to match with the other point cloud data is obtained. More specifically, the parameter of a rotation matrix and a parallel movement matrix for converting one point cloud data so as to match with the other point cloud data is obtained.

Since such a parameter is obtained in the positioning processing, by performing the positioning processing, displacement of the aircraft 200 from the position at the point of time of the (k-1)-th period to the position at the point of time of the k-th period can be specified. Accordingly, the current position of the aircraft 200 (the position at the point of time of the k-th period) can be specified. Note that the position estimation unit 122 estimates an initial position (the position at the point of time of a first period) of the aircraft 200 by calculating a centroid of the point cloud data, for example. Then, the position estimation unit 122 estimates the position of the aircraft 200 at the point of time of the k-th period (K>2) from the position of the aircraft 200 at the point of time of the (k-1)-th period and the displacement of the position obtained by a positioning result.

The route determination unit 123 predicts a future route of the aircraft 200 from a transition of the position of the aircraft 200 estimated by the position estimation unit 122. That is, the route determination unit 123 predicts the future route in the case where current moving direction and speed calculated from the transition of the position of the aircraft 200 estimated by the position estimation unit 122 continue. Then, the route determination unit 123 determines whether or not the predicted route of the aircraft 200 is appropriate.

Note that the route determination unit 123 may determine whether or not the route is appropriate according to an arbitrary predetermined determination criterion. For example, the route determination unit 123 may determine that the route of the aircraft 200 is not appropriate in the case where the route of the aircraft 200 is different from a prespecified route. In addition, for example, the route determination unit 123 may determine that the route of the aircraft 200 is not appropriate in the case where the route of the aircraft 200 obstructs the route of another aircraft. In this case, in order to recognize the route of another aircraft, the position and moving direction of another aircraft may be similarly estimated by the above-described method, or the position management device 100 may store route data indicating the route of another aircraft.

In the case where it is determined by the route determination unit 123 that the route of the aircraft 200 is not appropriate, the notification unit 124 notifies the aircraft 200 of a change of the moving direction. Note that the notification unit 124 may notify the aircraft 200 of the change of the speed instead of the change of the moving direction, or together with the change of the moving direction. The notification unit 124 may notify of the appropriate moving direction or speed.

Now, the emission direction of the beam emitted by the sensor 110 to measure the distance is limited to predetermined azimuth angle and elevation/depression angle. Therefore, it is preferable that the aircraft 200 flies so as to be irradiated with the beam in order to acquire the point cloud data. Accordingly, the notification unit 124 may notify the aircraft 200 of the moving direction so that the beam emitted by the sensor 110 to measure the distance impinges on the aircraft 200. In such a manner, the point cloud data for the aircraft 200 can be appropriately obtained.

Figure 7:
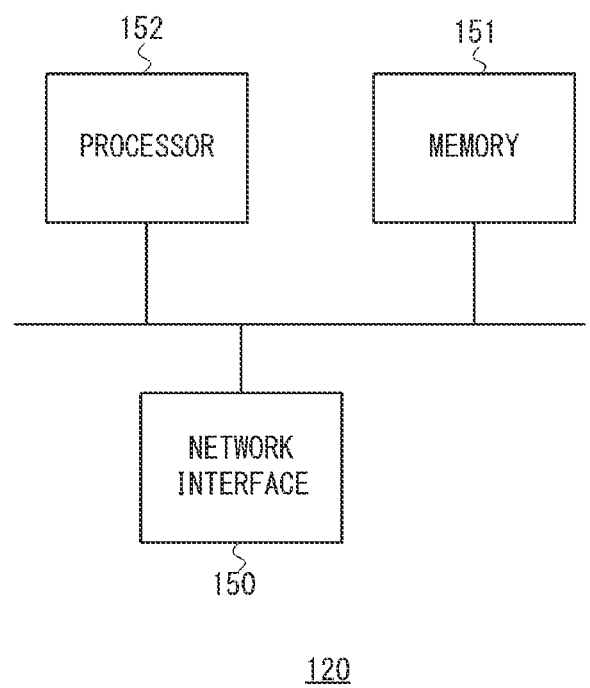
FIG. 7 is a schematic diagram illustrating an example of a hardware configuration of a control unit.

Next, an example of a hardware configuration of the control unit 120 will be described. FIG. 7 is a schematic diagram illustrating an example of the hardware configuration of the control unit 120.

As illustrated in FIG. 7, the control unit 120 includes a network interface 150, a memory 151 and a processor 152.

The network interface 150 is used to communicate with another device such as the aircraft 200. The notification unit 124 communicates with the aircraft 200 by wire or radio using the network interface 150.

The memory 151 is configured by a combination of a volatile memory and a nonvolatile memory, for example. The memory 151 is used to store software (computer program) including one or more instructions to be executed by the processor 152.

The processor 152 performs the processing of the control unit 120 by reading and executing the software (computer program) from the memory 151. The processor 152 may be a microprocessor, an MPU (Micro Processor Unit) or a CPU (Central Processing Unit), for example. The processor 152 may include a plurality of processors.

In this way, the control unit 120 has a function as a computer. Note that the aircraft 200 may also include the hardware configuration similarly. That is, the processing of the flight control unit 201 described above may be achieved by execution of the program by the processor.

In addition, the program described above is stored using various types of non-transitory computer-readable media, and can be supplied to the computer. The non-transitory computer-readable media include various types of tangible storage media. Examples of the non-transitory computer-readable media include a magnetic recording medium (such as a flexible disk, a magnetic tape and a hard disk drive), a magneto-optical recording medium (such as a magneto-optical disk), a CD-ROM (Read Only Memory), a CD-R, a CD-R/W, and a semiconductor memory (such as a mask ROM, a PROM (Programmable ROM), an EPROM (Erasable PROM), a flash ROM and a RAM (Random Access Memory)). In addition, the program may be supplied to the computer by various types of transitory computer-readable media. Examples of the transitory computer-readable media include electric signals, optical signals and electromagnetic waves. The transitory computer-readable medium can supply the program to the computer via a wired communication path such as an electric wire and an optical fiber, or a radio communication path.

Figure 8:
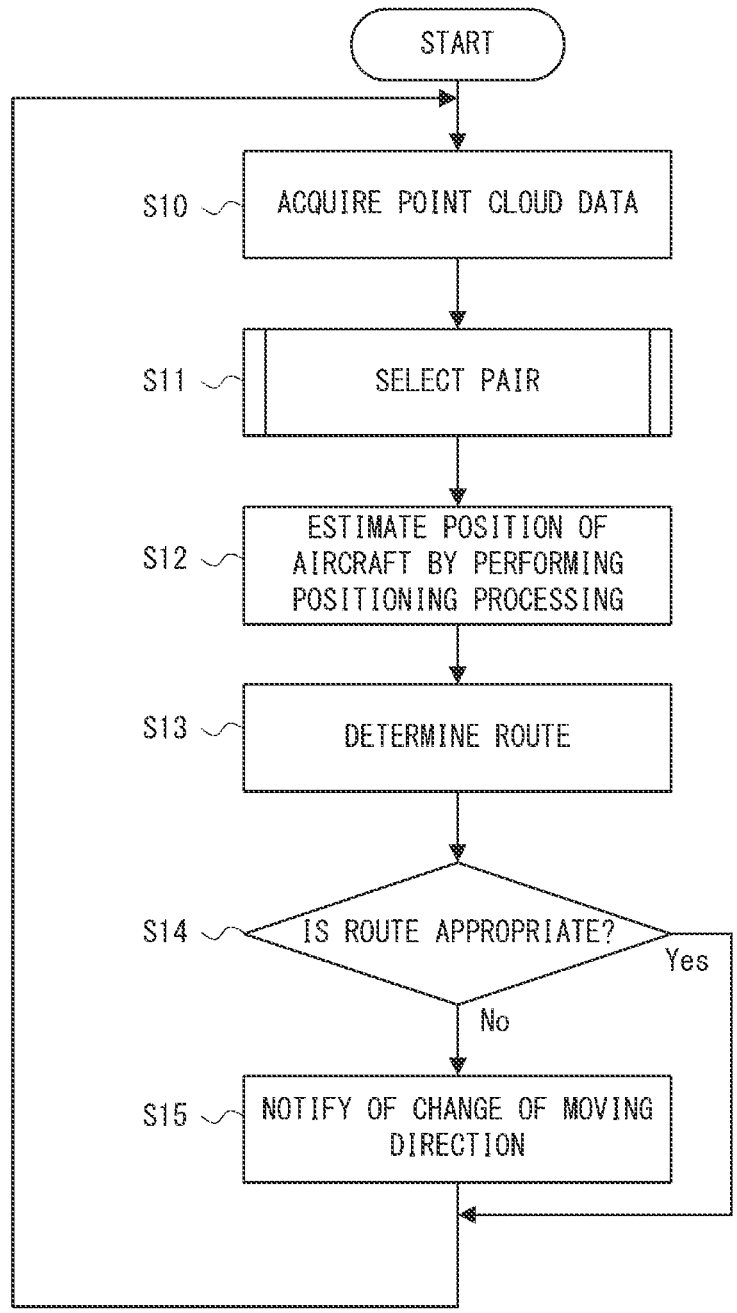
FIG. 8 is a flowchart illustrating an example of an operation of the position management device relating to the first example embodiment.
Figure 9:
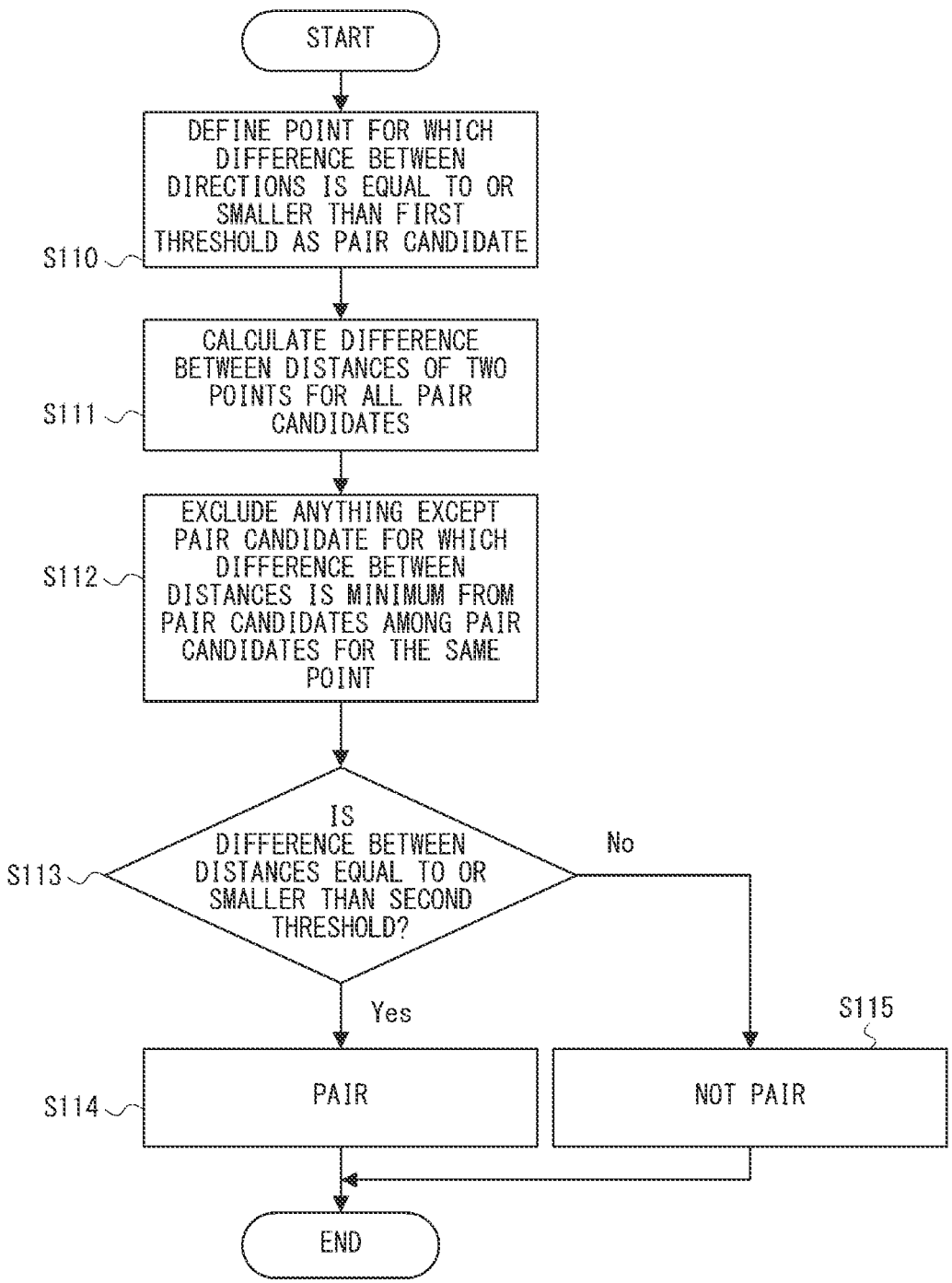
FIG. 9 is a flowchart illustrating an example of the operation of a pair selection unit.

Next, a flow of an operation of the position management device 100 will be described. FIG. 8 is a flowchart illustrating an example of the operation of the position management device 100. In addition, FIG. 9 is a flowchart illustrating an example of the operation of the pair selection unit 121. Hereinafter, the operation of the position management device 100 will be described along FIG. 8 and FIG. 9.

The position management device 100 periodically repeats the processing from step S10 to step S15. In other words, the position management device 100 repeats the following processing in each period t, that is, in each unit time.

In step S10, the sensor 110 acquires the point cloud data.

Then, in step S11, the pair selection unit 121 selects the pair of the coordinates between the latest point cloud data and the point cloud data acquired one period before.

Next, in step S12, the position estimation unit 122 estimates the position of the aircraft 200 by making both coordinates of the pair selected in step S11 correspond to each other and performing the positioning processing.

Then, in step S13, the route determination unit 123 predicts the future route of the aircraft 200 and determines whether or not the predicted route is appropriate. In the case where the route is inappropriate (No in step S14), the processing is shifted to step S15. In contrast, in the case where the route is appropriate (Yes in step S14), step S15 is skipped.

In step S15, the notification unit 124 notifies the aircraft 200 of the change of the moving direction. In response to that, the flight control unit 201 of the aircraft 200 changes the moving direction based on the notification.

Next, selection of the pair by the pair selection unit 121 (step S11) will be specifically described. As described above, the pair selection unit 121 selects the pair of the point (coordinates) between the first point cloud data which is the point cloud data acquired in the k-th period and the second point cloud data which is the point cloud data acquired in the (k-1)-th period. Hereinafter, the details of the processing of the pair selection unit 121 will be described along FIG. 9.

In step S110, the pair selection unit 121 defines two points one of which is the first point, the other of which is the second point, and for which the difference between the directions of both points viewed from the sensor 110 is equal to or smaller than a predetermined threshold $Th_1$ (first threshold) as pair candidates. Here, the first point is the point (coordinates) belonging to the first point cloud data, and the second point is the point (coordinates) belonging to the second point cloud data. The pair selection unit 121 defines all the two points satisfying the condition as the pair candidates. Therefore, the plurality of pair candidates may be generated for the same first point or the same second point. For example, as the pair candidates, $(p_1, p'_1)$, $(p_1, p'_2)$, $(p_2, p'_2)$ and the like may be generated. Here, $p_1$ and $p_2$ are the points belonging to the point cloud data of the k-th period, and $p'_1$ and $p'_2$ are the points belonging to the point cloud data of the (k-1)-th period.

Note that, in the case where the emission direction of the beam by the sensor 110 is the same in each period, there may be two points for which the difference between the directions of both points viewed from the sensor 110 is zero. However, in the case where the emission direction of the beam by the sensor 110 is shifted in each period as illustrated in FIG. 5, there cannot be the two points for which the difference between the directions of both points viewed from the sensor 110 is zero. The pair selection unit 121 extracts the two points in the close directions on condition that the difference between the directions is equal to or smaller than the threshold $Th_1$.

Next, in step S111, the pair selection unit 121 calculates the difference between the distances of the two points for all the pair candidates extracted in step S110. That is, the pair selection unit 121 calculates the difference between the distance from the sensor 110 of one point configuring the pair and the distance from the sensor 110 of the other point, in each pair candidate.

Then, in step S112, in the case where the plurality of pair candidates are generated for the same point, the pair selection unit 121 excludes anything except the pair candidate for which the difference between the distances calculated in step S111 is minimum from the pair candidates. That is, in the case where the plurality of pair candidates are generated for the same point, the pair selection unit 121 retains only the pair candidate for which the difference between the distances is minimum. In the above-described example, since the two pair candidates $(p_1, p'_1)$ and $(p_1, p'_2)$ are generated for the point $p_1$, only either one of the pair candidates is retained based on the difference between the distances.

In such a manner, in the case where there are the plurality of second points for which the difference between the directions viewed from the sensor 110 is equal to or smaller than the first threshold for the same first point, the pair selection unit 121 defines the second point for which the difference between the distance from the sensor 110 of the first point and the distance from the sensor 110 of the second point is minimum as the pair candidate. Similarly, in the case where there are the plurality of first points for which the difference between the directions viewed from the sensor 110 is equal to or smaller than the first threshold for the same second point, the pair selection unit 121 defines the first point for which the difference between the distance from the sensor 110 of the first point and the distance from the sensor 110 of the second point is minimum as the pair candidate. In this way, since the pairs for the same point can be narrowed down to just one, correspondence of the first point cloud data and the second point cloud data can be appropriately determined.

Depending on the shape of the object which is a measuring target, the measured distance may become greatly different when the emission direction of the beam is just slightly different. Such an event occurs at an end portion of the shape of a three-dimensional object, for example. In the positioning processing, a value of the parameter is determined so as to bring the point of one point cloud data and the point of the other point cloud data closer. Therefore, when the two points of the greatly different distances are used in the positioning processing, the two points greatly affect a positioning result so that there is a risk that an appropriate positioning result cannot be obtained. Then, in the present example embodiment, the following processing is performed so as to obtain the appropriate positioning result.

In step S113, the pair selection unit 121 determines whether or not the difference between the distances calculated in step S111 is equal to or smaller than a predetermined threshold $Th_2$ (second threshold), for the retained pair candidate.

The pair selection unit 121 excludes the pair candidate exceeding the predetermined threshold $Th_2$ (step S115), and defines the pair candidate of the threshold $Th_2$ or smaller as a proper pair (step S114). In this way, the pair selection unit 121 selects the pair of the coordinates from the first point cloud data and the second point cloud data.

The pair selection unit 121 outputs one or more proper pairs obtained in step S113 to the position estimation unit 122. For that, in step S12 in FIG. 8, the position estimation unit 122 performs the positioning processing as follows. The position estimation unit 122 performs the positioning processing such that the points get closer to each other by using the coordinates of the points configuring the proper pair selected by the pair selection unit 121 among the point cloud data acquired in the k-th period and the point cloud data acquired in the (k-1)-th period.

In such a manner, the pair selection unit 121 selects the pair of the coordinates by pairing the points in the case where the difference between the direction of the first point and the direction of the second point is equal to or smaller than the first threshold and the difference between the distance of the first point and the distance of the second point is equal to or smaller than the second threshold.

Note that, while the pair selection unit 121 allows the generation of the plurality of pair candidates for the same point in step 110 in the above-described flowchart, the pair selection unit 121 may not allow the generation of the plurality of pair candidates. That is, one pair candidate may be generated at maximum for the same point. In this case, for example, among combinations of the first point and the second point for which the difference between the directions is equal to or smaller than the predetermined threshold $Th_1$, the pair selection unit 121 defines only the combination for which the difference between the directions is minimum as the pair candidate in step S110. Note that, in this case, since the plurality of pair candidates are not generated for the same point, the processing of step S112 described above is omitted.

In addition, while the pair candidates are excluded based on the difference between the distances in step S113 in the above-described flowchart, such exclusion may not be necessarily performed. That is, step S113 may be omitted. However, in order to more accurately perform the positioning processing, it is preferable to perform the processing in step S113.

Further, since the beam is radially emitted from the sensor 110, as the aircraft 200 is farther from the sensor 110, a density of the beams that impinge on the aircraft 200 declines. That is, as the aircraft 200 is farther from the sensor 110, the density of measurement points declines. Therefore, as the aircraft 200 is farther, an interval of the measurement points increases. In other words, depending on how far the aircraft 200 to be measured is from the sensor 110, a measurement condition (a measurement interval on the surface of the aircraft 200) becomes different. Thus, it is not preferable to use a fixed value as the threshold $Th_2$ for the difference between the distances, which is the threshold for determining validity of the pair.

Then, in the present example embodiment, in order to set the threshold according to a measurement condition, the pair selection unit 121 sets the value of the threshold $Th_2$ based on a statistic for the difference between the distance from the sensor 110 of the first point and the distance from the sensor 110 of the second point. Specifically, in each period, in step S113, the pair selection unit 121 calculates a standard deviation s from a distribution for all the differences between the distances calculated in step S111. Then, the pair selection unit 121 sets a product of the calculated standard deviation s and a predetermined coefficient a as the value of the threshold $Th_2$. The value of the coefficient α is a constant value, and is a predetermined integer value for example. In the present example embodiment, the pair selection unit 121 calculates the value of the threshold $Th_2$ in each period in such a manner, however, the fixed value, that is, the constant value may be used as the threshold $Th_2$.

Figure 10:
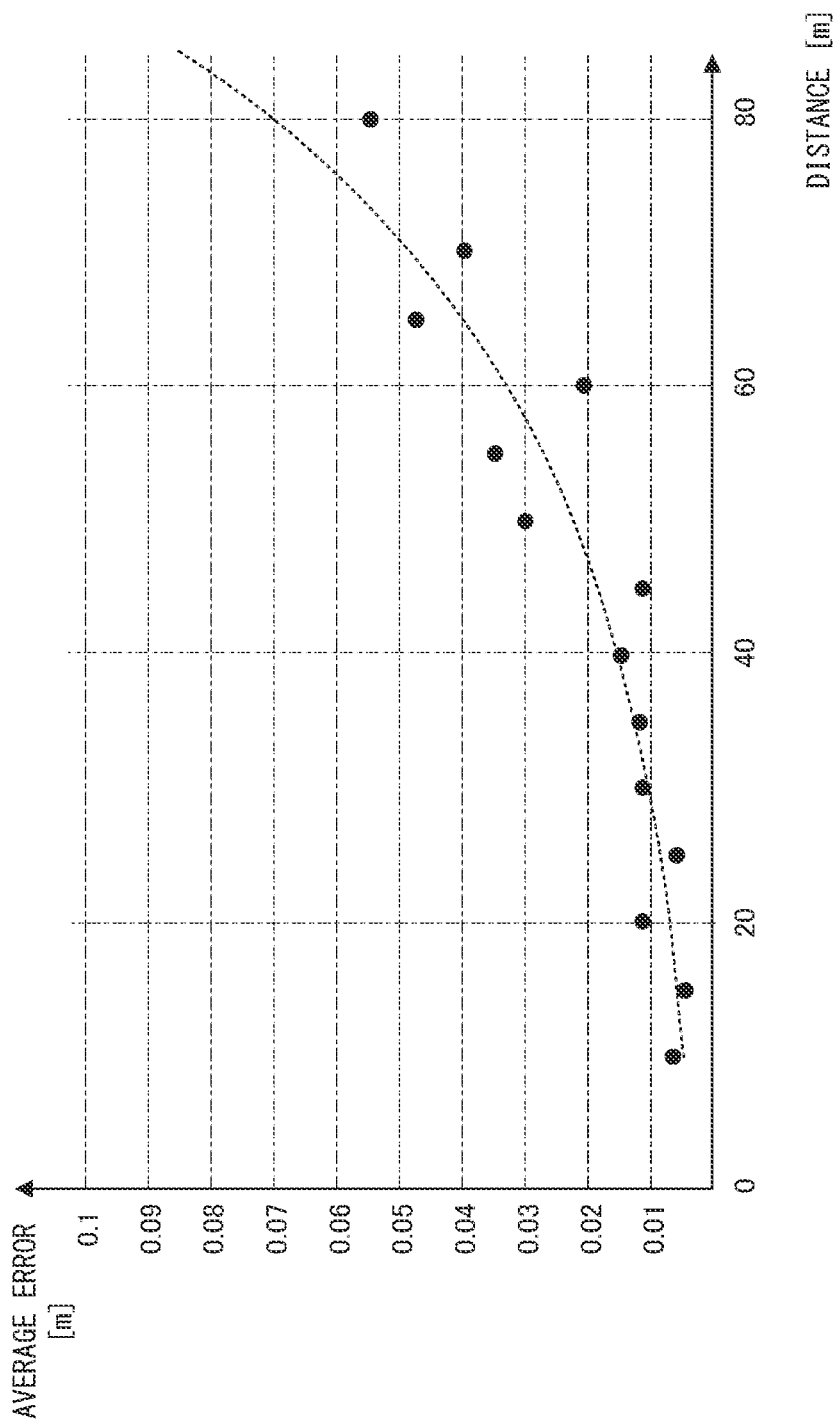
FIG. 10 is a graph illustrating accuracy of positioning processing when simulating behavior of the position management system relating to the first example embodiment.

FIG. 10 is a graph illustrating accuracy of the positioning processing when simulating behavior of the position management system 10. In the simulation, a three-dimensional model imitating the aircraft 200 is made to fly in a virtual space, and a measuring operation of the sensor 110 is simulated. Then, to the point cloud data obtained by the simulation, the pair selecting processing and the positioning processing described above are performed. The horizontal axis indicates the distance from the sensor 110 to the aircraft 200. The vertical axis indicates an error of a positioning processing result. In more detail, the vertical axis indicates an average of the errors of the coordinates of the point cloud data obtained by converting the point cloud data which is one of positioning targets using the parameter obtained as the positioning result and the point cloud data which is the other of the positioning targets. Note that, in the example illustrated in FIG. 10, the aircraft 200 approaches the sensor 110 at the speed of 5 meters per second, and the sensor 110 acquires the point cloud data in the period of each 50 milliseconds. As illustrated in FIG. 10, according to the present simulation, positioning is performed with such high accuracy that the average error is less than 10 centimeters near the distance of 80 meters.

The first example embodiment has been described above. In order to appropriately manage the position of the aircraft 200, a distance measurement period (period t) needs to be a short period of time (for example, about 50 milliseconds). In this case, the number of the measurement points to the aircraft 200 in each period is limited. That is, the number of pieces (the number of the points) of the point cloud data corresponding to the aircraft 200 at a certain point of time to be obtained is limited. Therefore, there is a risk that the positioning result of sufficient accuracy cannot be obtained in the case of simply using existing positioning processing algorithm. In contrast, in the present example embodiment, the positioning processing is performed after specifying the pair of the points to be brought closer by the pair selection unit 121 so that the positioning processing is accurately performed even with a small number of pieces of the data. Accordingly, the position of the aircraft 200 can be appropriately managed. In particular, according to the present example embodiment, the position of the aircraft 200 can be recognized without providing a mark on the aircraft 200.

Second Example Embodiment

Next, the second example embodiment will be described. In the present example embodiment, the position management device appropriately manages the positions of the plurality of aircraft 200. The position management system in the present example embodiment is different from the position management system 10 relating to the first example embodiment at the point that the position management device 100 is replaced with a position management device 101.

Figure 11:
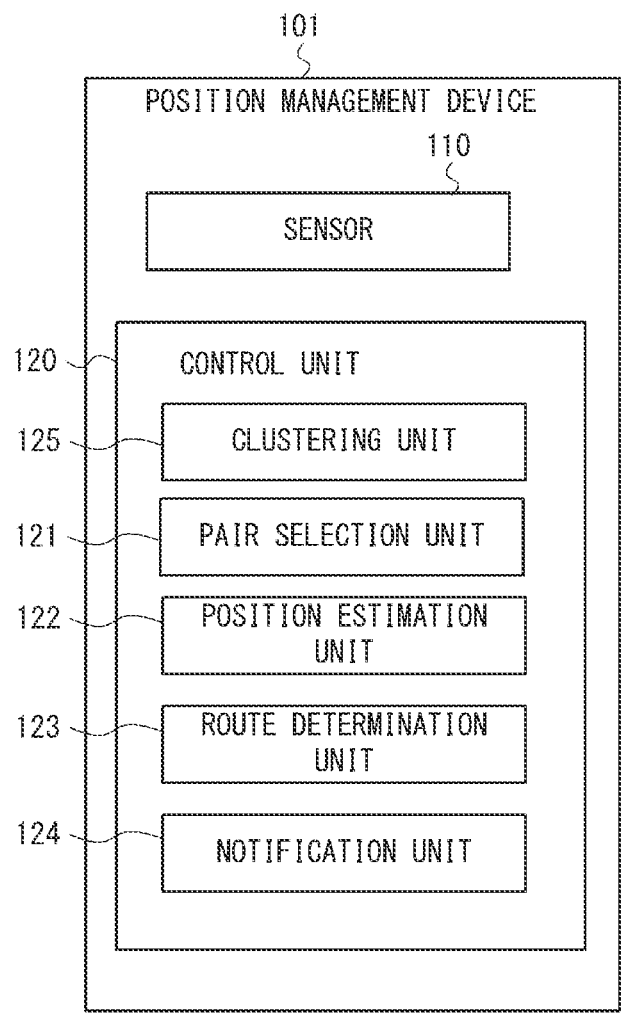
FIG. 11 is a schematic diagram illustrating an example of the configuration of the position management device relating to a second example embodiment.

FIG. 11 is a schematic diagram illustrating an example of the configuration of the position management device 101 relating to the second example embodiment. The position management device 101 is different from the position management device 100 of the first example embodiment at the point that the control unit 120 further includes a clustering unit 125. In the following description, the description which overlaps with the first example embodiment will be appropriately omitted.

The clustering unit 125 generates clusters by performing clustering processing to the point cloud data obtained from the sensor 110 in each period. Note that the clustering unit 125 generates the clusters using known arbitrary clustering algorithm (for example, Euclidean clustering). Thus, the clusters of the point cloud data for each aircraft 200 can be obtained.

In the present example embodiment, the pair selection unit 121 performs the pair selecting processing for each cluster. In addition, in the present example embodiment, the position estimation unit 122 performs the positioning processing and the position estimation for each cluster. That is, the position estimation unit 122 estimates the position of each aircraft 200 by performing the positioning processing of the first point cloud data and the second point cloud data for each cluster. Thus, the position of each aircraft 200 can be managed.

In addition, in the present example embodiment, the pair selection unit 121 sets the value of the threshold $Th_2$ based on the statistic (standard deviation s) for the difference between the distance from the sensor 110 of the first point and the distance from the sensor 110 of the second point for each cluster. That is, the standard deviation s is calculated for each cluster, and the value of the threshold $Th_2$ is set for each cluster. In such a manner, the pair selection unit 121 does not calculate the statistic from the distribution of all the point cloud data present in the three-dimensional space but calculates the statistic from the distribution of the point cloud data for each cluster. Thus, the value of the threshold $Th_2$ can be appropriately set.

Figure 12:
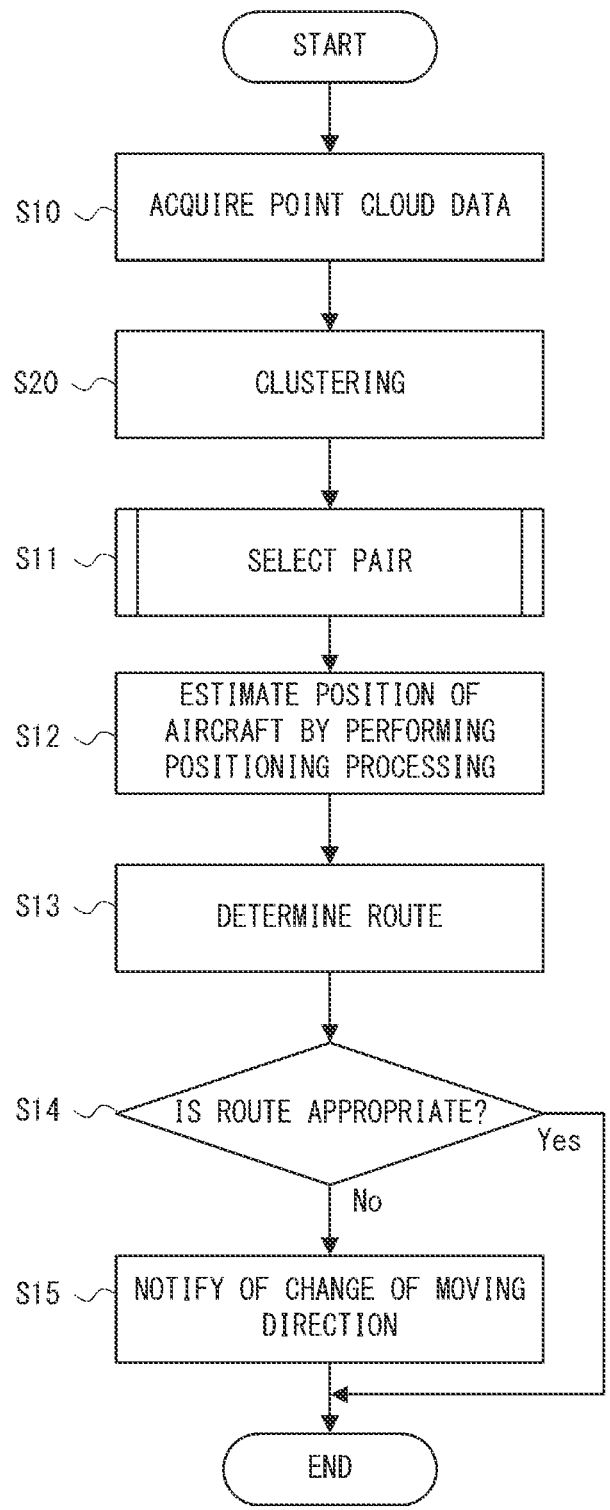
FIG. 12 is a flowchart illustrating an example of the operation of the position management device relating to the second example embodiment.

FIG. 12 is a flowchart illustrating an example of the operation of the position management device 101. The flowchart illustrated in FIG. 12 is different from the flowchart illustrated in FIG. 8 at the point that step S20 is added between step S10 and step S11. The position management device 101 periodically repeats the processing of the steps illustrated in FIG. 12. In other words, the position management device 100 repeats the processing of the steps illustrated in FIG. 12 in each period t, that is, in each unit time.

As illustrated in FIG. 12, in the present example embodiment, after step S10, the processing is shifted to step S20. In step S20, the clustering unit 125 performs the clustering processing and generates the clusters of the point cloud data. After step S20, the processing is shifted to step S11. Thereafter, the processing similar to the first example embodiment is performed. However, as described above, the pair selection unit 121 selects the pair and sets the value of the threshold $Th_2$ for each cluster, and the position estimation unit 122 executes the positioning processing for each cluster.

The present invention has been described with reference to the example embodiments, however, the present invention is not limited by the above. The configuration and details of the present invention can be variously changed in such a manner that a person skilled in the art can understand within the scope of the invention.

A part or all of the example embodiments described above can be also described as supplementary notes below but are not limited to the below.

Supplementary Note 1

A position management device comprising:
a sensor configured to measure distances of a plurality of parts of a moving object in each unit time and acquire point cloud data indicating coordinates on a space of the plurality of parts in each unit time;
pair selection means for selecting a pair of the coordinates between first point cloud data which is the point cloud data acquired at a first point of time and second point cloud data which is the point cloud data acquired at a second point of time the unit time before the first point of time; and
position estimation means for estimating a position of the moving object by making both coordinates of the pair selected by the pair selection means correspond to each other and performing positioning processing of the first point cloud data and the second point cloud data,
wherein the pair selection means selects the pair of the coordinates by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

Supplementary Note 2

The position management device according to Supplementary note 1, wherein the pair selection means selects the pair of the coordinates by pairing the first point and the second point in the case where the difference between the direction viewed from the sensor of the first point and the direction viewed from the sensor of the second point is equal to or smaller than the predetermined first threshold and a difference between the distance from the sensor of the first point and the distance from the sensor of the second point is equal to or smaller than a predetermined second threshold.

Supplementary Note 3

The position management device according to Supplementary note 2, wherein the pair selection means sets a value of the second threshold based on a statistic for the difference between the distance from the sensor of the first point and the distance from the sensor of the second point.

Supplementary Note 4

The position management device according to any one of Supplementary notes 1 to 3, further comprising clustering means for performing clustering processing to the point cloud data and generating clusters,
wherein the position estimation means performs the positioning processing of the first point cloud data and the second point cloud data for each of the clusters.

Supplementary Note 5

The position management device according to Supplementary note 3, further comprising clustering means for performing clustering processing to the point cloud data and generating clusters, wherein
the pair selection means sets the value of the second threshold based on the statistic for each of the clusters, and
the position estimation means performs the positioning processing of the first point cloud data and the second point cloud data for each of the clusters.

Supplementary Note 6

The position management device according to any one of Supplementary notes 1 to 5, wherein the pair selection means defines the second point for which the difference between the distance from the sensor of the first point and the distance from the sensor of the second point is minimum as a pair candidate in the case where there are a plurality of second points for which the difference between the directions viewed from the sensor is equal to or smaller than the first threshold for the same first point, and defines the first point for which the difference between the distance from the sensor of the first point and the distance from the sensor of the second point is minimum as a pair candidate in the case where there are a plurality of first points for which the difference between the directions viewed from the sensor is equal to or smaller than the first threshold for the same second point.

Supplementary Note 7

The position management device according to any one of Supplementary notes 1 to 6, further comprising route determination means for determining whether or not a route of the moving object predicted from a transition of the position of the moving object estimated by the position estimation means is appropriate.

Supplementary Note 8

The position management device according to Supplementary note 7, further comprising notification means for notifying the moving object of a change of a moving direction or speed in the case where it is determined that the route of the moving object is not appropriate by the route determination means.

Supplementary Note 9

The position management device according to Supplementary note 8, wherein the notification means notifies the moving object of the moving direction such that a beam emitted by the sensor to measure the distance impinges on the moving object.

Supplementary Note 10

A position management system, comprising:
an aircraft and a position management device, wherein the position management device includes
a sensor configured to measure distances of a plurality of parts of the aircraft in each unit time and acquire point cloud data indicating coordinates on a space of the plurality of parts in each unit time,
pair selection means for selecting a pair of the coordinates between first point cloud data which is the point cloud data acquired at a first point of time and second point cloud data which is the point cloud data acquired at a second point of time the unit time before the first point of time, and
position estimation means for estimating a position of the aircraft by making both coordinates of the pair selected by the pair selection means correspond to each other and performing positioning processing of the first point cloud data and the second point cloud data, and
the pair selection means selects the pair of the coordinates by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

Supplementary Note 11

The position management system according to Supplementary note 10, wherein
the position management device further includes
route determination means for determining whether or not a route of the aircraft predicted from a transition of the position of the aircraft estimated by the position estimation means is appropriate, and
notification means for notifying the aircraft of a change of a moving direction or speed in the case where it is determined that the route of the aircraft is not appropriate by the route determination means, and
the aircraft includes flight control means for controlling flight according to notification from the notification means.

Supplementary Note 12

A position management method, wherein distances of a plurality of parts of a moving object are measured in each unit time by a sensor,
point cloud data indicating coordinates on a space of the plurality of parts is acquired in each unit time,
a pair of the coordinates is selected between first point cloud data which is the point cloud data acquired at a first point of time and second point cloud data which is the point cloud data acquired at a second point of time the unit time before the first point of time,
a position of the moving object is estimated by making both coordinates of the selected pair correspond to each other and performing positioning processing of the first point cloud data and the second point cloud data, and
in selecting the pair of the coordinates, the pair of the coordinates is selected by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

Supplementary Note 13

A non-transitory computer-readable medium having a program stored thereon, the program being configured to make a computer execute
a pair selection step of selecting a pair of coordinates between first point cloud data which is point cloud data acquired at a first point of time by a sensor which measures distances of a plurality of parts of a moving object in each unit time and acquires the point cloud data indicating the coordinates on a space of the plurality of parts in each unit time and second point cloud data which is the point cloud data acquired at a second point of time the unit time before the first point of time and
a position estimation step of estimating a position of the moving object by making both coordinates of the selected pair correspond to each other and performing positioning processing of the first point cloud data and the second point cloud data, and
in the pair selection step, the pair of the coordinates is selected by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

REFERENCE SIGNS LIST

1 POSITION MANAGEMENT DEVICE
2 SENSOR
3 PAIR SELECTION UNIT
4 POSITION ESTIMATION UNIT
10 POSITION MANAGEMENT SYSTEM
50 EMISSION DIRECTION
51 EMISSION RANGE
52 BEAM
53 SCANNING TRACK
54 SCANNING TRACK
55 BEAM
100 POSITION MANAGEMENT DEVICE
101 POSITION MANAGEMENT DEVICE
110 SENSOR
120 CONTROL UNIT
121 PAIR SELECTION UNIT
122 POSITION ESTIMATION UNIT

123 ROUTE DETERMINATION UNIT
124 NOTIFICATION UNIT
125 CLUSTERING UNIT
150 NETWORK INTERFACE
151 MEMORY
152 PROCESSOR
200 AIRCRAFT
201 FLIGHT CONTROL UNIT

What is claimed is:

1. A position management device comprising:
a sensor configured to measure distances of a plurality of parts of a moving object in each unit time and acquire point cloud data indicating coordinates on a space of the plurality of parts in each unit time;
at least one memory storing instructions; and
at least one processor configured to execute the instructions stored in the memory to:
select a pair of the coordinates between first point cloud data which is the point cloud data acquired at a first point of time and second point cloud data which is the point cloud data acquired at a second point of time the unit time before the first point of time; and
estimate a position of the moving object by making both coordinates of the selected pair correspond to each other and performing positioning processing of the first point cloud data and the second point cloud data,
wherein the processor is configured to execute the instructions to select the pair of the coordinates by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

2. The position management device according to claim 1, wherein the processor is configured to execute the instructions to select the pair of the coordinates by pairing the first point and the second point in the case where the difference between the direction viewed from the sensor of the first point and the direction viewed from the sensor of the second point is equal to or smaller than the predetermined first threshold and a difference between the distance from the sensor of the first point and the distance from the sensor of the second point is equal to or smaller than a predetermined second threshold.

3. The position management device according to claim 2, wherein the processor is configured to execute the instructions to set a value of the second threshold based on a statistic for the difference between the distance from the sensor of the first point and the distance from the sensor of the second point.

4. The position management device according to claim 1, wherein the processor is configured to execute the instructions to:
perform clustering processing to the point cloud data and generate clusters, and
perform the positioning processing of the first point cloud data and the second point cloud data for each of the clusters.

5. The position management device according to claim 3, wherein the processor is configured to execute the instructions to:
perform clustering processing to the point cloud data and generate clusters,
set the value of the second threshold based on the statistic for each of the clusters, and
perform the positioning processing of the first point cloud data and the second point cloud data for each of the clusters.

6. The position management device according to claim 1, wherein the processor is configured to execute the instructions to define the second point for which the difference between the distance from the sensor of the first point and the distance from the sensor of the second point is minimum as a pair candidate in the case where there are a plurality of second points for which the difference between the directions viewed from the sensor is equal to or smaller than the first threshold for the same first point, and define the first point for which the difference between the distance from the sensor of the first point and the distance from the sensor of the second point is minimum as a pair candidate in the case where there are a plurality of first points for which the difference between the directions viewed from the sensor is equal to or smaller than the first threshold for the same second point.

7. The position management device according to claim 1, wherein the processor is configured to execute the instructions to determine whether or not a route of the moving object predicted from a transition of the estimated position of the moving object is appropriate.

8. The position management device according to claim 7, wherein the processor is configured to execute the instructions to notify the moving object of a change of a moving direction or speed in the case where it is determined that the route of the moving object is not appropriate.

9. The position management device according to claim 8, wherein the processor is configured to execute the instructions to notify the moving object of the moving direction such that a beam emitted by the sensor to measure the distance impinges on the moving object.

10. A position management method, wherein
distances of a plurality of parts of a moving object are measured in each unit time by a sensor,
point cloud data indicating coordinates on a space of the plurality of parts is acquired in each unit time,
a pair of the coordinates is selected between first point cloud data which is the point cloud data acquired at a first point of time and second point cloud data which is the point cloud data acquired at a second point of time the unit time before the first point of time,
a position of the moving object is estimated by making both coordinates of the selected pair correspond to each other and performing positioning processing of the first point cloud data and the second point cloud data, and
in selecting the pair of the coordinates, the pair of the coordinates is selected by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

11. A non-transitory computer-readable medium having a program stored thereon, the program being configured to make a computer execute
a pair selection step of selecting a pair of coordinates between first point cloud data which is point cloud data acquired at a first point of time by a sensor which measures distances of a plurality of parts of a moving object in each unit time and acquires the point cloud data indicating the coordinates on a space of the plurality of parts in each unit time and second point cloud data which is the point cloud data acquired at a second point of time the unit time before the first point of time and a position estimation step of estimating a position of the moving object by making both coordinates of the selected pair correspond to each other and performing positioning processing of the first point cloud data and the second point cloud data, and in the pair selection step, the pair of the coordinates is selected by pairing a first point belonging to the first point cloud data and a second point belonging to the second point cloud data in a case where a difference between a direction viewed from the sensor of the first point and a direction viewed from the sensor of the second point is equal to or smaller than a predetermined first threshold.

* * * * *